United States Patent [19]

Baczek et al.

[11] 4,266,036

[45] May 5, 1981

[54] RECOVERY OF POLYMERIC CATION EXCHANGE MATERIALS FOR REUSE BY CONVERTING BY REACTION TO THE PRECURSOR FORM

[75] Inventors: Stanley K. Baczek; G. Howard McCain, both of Painesville, Ohio

[73] Assignee: Diamond Shamrock Corporation, Dallas, Tex.

[21] Appl. No.: 87,328

[22] Filed: Oct. 23, 1979

[51] Int. Cl.³ .................... C25B 13/08; C08L 27/12; C08J 5/22; C08J 7/12
[52] U.S. Cl. ......................................... 521/26; 521/31
[58] Field of Search ................................. 521/26, 31

[56] References Cited

U.S. PATENT DOCUMENTS 4,176,215  11/1979  Molnar et al. .................... 521/27

FOREIGN PATENT DOCUMENTS 52-24177  2/1977  Japan ......................................... 521/26
52-36589  3/1977  Japan ......................................... 521/26

Primary Examiner—Joseph L. Schofer
Assistant Examiner—Peter F. Kulkosky
Attorney, Agent, or Firm—John P. Hazzard

[57] ABSTRACT

Normally solid copolymers of a fluorinated vinyl monomer and a perfluorinated vinyl compound having a carboxyl and/or sulfonyl group attached directly to the perfluorinated vinyl group or indirectly through an alkyl or ether linkage have been found to be soluble in low molecular weight polymers of perhalogenated alkyl ethers, low molecular weight polymers of perhalogenated alkyls and perfluoro kerosenes, each of said solvent materials having boiling points between about 200° C. and 350° C. The copolymeric material dissolved in accordance with the instant invention can readily be resolidified by solvent removal and hydrolyzed or converted to the salt form to become a cation exchange material having an equivalent weight in the range of 1000 to 1600.

When these cation exchange materials in the salt form become damaged or contaminated during operation, for example in an electrochemical cell, they may now be reclaimed rather than discarded. The process involves conversion of the salt form of the cation exchanger to the precursor sulfonyl fluoride, carbonyl fluoride, sulfonate ester, or carboxylate ester form followed by dissolution in one of the solvents mentioned above. Dissolved impurities are then removed, e.g., by filtration, and the purified precursor cation exchange material in dissolved state may be shaped into the desired form by solvent removal and hydrolyzed back to the purified cation exchange polymeric material.

2 Claims, No Drawings

RECOVERY OF POLYMERIC CATION EXCHANGE MATERIALS FOR REUSE BY CONVERTING BY REACTION TO THE PRECURSOR FORM

BACKGROUND OF THE INVENTION

This invention relates to the recovery of polymeric cation exchange materials which are commonly used as separators in batteries and fuel cells as well as electrochemical cells such as for the production of chlorine and caustic. Other uses for these materials include their use as acid catalysts. In each of these uses, the ion exchange material has a finite life due both to mechanical damage and to the accumulation of impurities within the cation exchange membrane structure. At present, these materials are merely replaced by new material and the contaminated or damaged cation exchange material discarded, in spite of the great expense of said material. Typical of the cation exchange copolymers involved in the instant invention are the fluorocarbon vinyl ether polymers disclosed in U.S. Pat. No. 3,282,857. This patent discloses the copolymerization of fluorocarbon vinyl ethers having sulfonyl groups attached thereto with fluorinated vinyl compounds. Of the various copolymers listed in U.S. Pat. No. 3,282,875 is the copolymer produced by the copolymerization of tetrafluoroethylene with perfluoro(3,6-dioxa-4-methyl-7-octene sulfonyl fluoride). This is the base copolymer from which most of the membranes in commercial use today are made.

Another example of cation exchange resins useful in the instant invention are those described in U.S. Pat. No. 3,718,627. The disclosed ion exchange resins are copolymers of tetrafluoroethylene and compounds of the formula $CF_2CF(CF_2)_nSO_2F$. After polymerization of either of these materials of the prior art, the copolymer must be hydrolyzed to obtain its ion exchange character. Typically, such materials are treated with caustic to convert the sulfonyl halide group to the alkali metal salt thereof.

These known perfluorocarbon-type cation exchange membranes containing only sulfonic acid groups, however, have been found to have a disadvantage when used in the electrolysis of an aqueous solution of an alkali metal halide. They tend to permit penetration therethrough of excessive hydroxy ions by back migration from the cathode compartment because of the high hydrophilicity of the sulfonic acid group. As a result, the current efficiency during electrolysis at higher caustic concentrations is lower. At extremely high caustic concentrations, the process becomes economically disadvantageous compared to other methods of electrolysis of sodium chloride solutions, such as the mercury or diaphragm processes. Many attempts have been made to avoid this disadvantage of lower current efficiency by a number of means. Initially, people in the art attempted to utilize membrane containing less sulfonic acid groups, or expressed in another manner, membrane materials having a higher equivalent weight. Such lowering of the sulfonic acid group concentration or the increase of the equivalent weight of the membrane does indeed limit the back migration of hydroxyl ions, but results in a serious decrease in the electroconductivity of the membrane and, thus, a proportional increase in the power consumption is noted.

A number of solutions to this problem have been attempted in the prior art. Typical of such attempts is the surface modification of the membrane material on the cathode side to attempt to minimize back migration of hydroxyl ions. One such attempt was to laminate to the surface of a membrane of low equivalent weight a thin surface layer of material having a higher equivalent weight so as to minimize back migration. This attempt has not been successful due to the fact that such laminated membranes do not join together well and in operation tend to separate and in extreme cases, rupture. The laminating technique itself puts much stress on the copolymeric materials in that higher temperatures are required in the calendering of the melt processable copolymer to thin sheets. While the copolymeric material is melt processable, the temperatures at which it flows are very close to the temperatures at which degradation can take place. Thus, melt process fabrication methods must be tightly controlled and are at best difficult.

Later attempts to improve membrane cells by reducing hydroxyl back migration in, for example, chloro-alkali cells was to treat the cathode surface of the membrane with an amine, whether mono- or diamine or ammonia or to surface modify a sulfonyl membrane to convert the surface layer facing the cathode to a corresponding carboxylic material. Typical of this method is that described in U.S. Pat. No. 4,151,053, incorporated herein by reference.

The manufacture of thin sheets of the copolymeric materials in the past have been as expressed previously, very tedious. The copolymeric material would be melted and calendered to the required thickness. In cases where reinforcing fabric were included with the sheet of membrane, the problems were further increased because the flowability of the copolymeric material at processing temperatures is limited, and if the temperatures are raised to improve the flowability, the polymeric material degrades. In almost all cases, the membrane materials must be reinforced so as to be sufficiently rugged to be economically advantageous in the uses envisioned. Typical of the problems encountered is in preparing fabric reinforced sheet membranes can be found in U.S. Pat. No. 4,147,844.

In addition to the sulfonyl type cation exchange material discussed previously, similar carboxyl containing ion exchange materials are heavily used in the indicated areas. Whether used in the sulfonic or carboxylic form, the membranes can be utilized as films, reinforced films, or pellets, as when used as a catalyst and are usually employed in the acid or alkali metal salt form.

BRIEF SUMMARY OF THE INVENTION

Highly fluorinated cation exchange materials containing sulfonyl and/or carboxyl groups have been widely used in various industries. For example, such materials are used in chloro-alkali membrane cells and as acid catalysts. The highly fluorinated nature of these products has resulted in numerous processing problems since the equivalent weight range in which such materials have been found to be useful as cation exchange materials were essentially unrecoverable prior to the instant invention. By the process of the instant invention, it has been found that the spent cation exchange materials, whether in the sulfonic or carboxyl form, can be converted to the soluble sulfonyl fluoride, carbonyl fluoride, sulfonyl ester, carboxylic ester form, which can be dissolved in a solvent selected from the group consisting of low molecular weight polymers of perhalogenatedalkyl ethers, lower molecular weight polymers of perhalogenated alkyls, and perfluorokerosenes, each of said solvents having boiling points between about 200° C. and 350° C. In the dissolved state, the cation exchange material may be separated from the impurities, the reinforcing fabrics, and other foreign matter associated therewith by filtering or the like. After purification, this solvent material containing the dissolved cation exchange material can be reshaped to the desired form and the solvent removed to result in a reformed cation exchange material having the properties of the new cation exchange materials. This recovery technique is particularly important in areas such as solid polymer electrolyte-type cells (SPE). In SPE cells, the cation exchange material is the solid polymer electrolyte and the one or more surfaces thereof have embedded therein precious metal oxides which serve as the electrodes in the cell. In this case, the precious metal oxides can be easily recovered by filtration and the cation exchange material may be reused. If the present process is utilized in the recovery of scrap material which has not been converted to the acid form or alkali metal salt form, i.e., the cation exchange material is still in the sulfonyl fluoride form or the carboxylic acid form, the cation exchange material can be dissolved directly without chemical conversion, as previously discussed.

DETAILED DESCRIPTION OF THE INVENTION

Copolymeric ion exchange materials are well known in the art. Typically, these are highly fluorinated resins containing sulfonic acid or carboxylic acid groups or salts thereof attached to the copolymer. The useful range of equivalent weights, i.e., the weight of one mole of resin/weight of cation exchange group in said one mole of resin, found to be useful are generally in the range of 1000 to 1600. The highly fluorinated materials in this equivalent weight range, however, are extremely difficult to process since the highly fluorinated nature makes them somewhat akin to polytetrafluoroethylene which requires special processing techniques. The cation exchange materials are not processed in the ionic form, but rather in the precursor form referred to in this application as the intermediate polymer. By intermediate polymer is meant the form of the copolymeric resin before it is converted to the ionic form. In the intermediate form, the sulfonyl portion of the molecule is in the sulfonyl fluoride or sulfonate ester form. If the carboxyl group is present, it can be in the carboxyl ester or carbonyl fluoride form. This precursor or intermediate resin is thermoplastic or melt processable and, thus, prior art techniques for shaping and forming sheets or other shaped forms involved hot pressing, calendering, molding or the like techniques to bond individual particles of intermediate polymer together to result in the desired form or shape of material. The degree of freedom in such processing is extremely limited since the resulting material is quite heat sensitive, and overheating in the forming step can, in fact, decrease the utility of the resulting cation exchange material.

Further difficulties in processing the materials of the prior art are encountered when it is desired to reinforce intermediate polymer with a fabric or the like. Typical such methods are described in U.S. Pat. No. 3,925,135.

By the discovery of a solvent for the intermediate polymer in the present invention, such processing difficulties are overcome, and sheets of any size or laminates of any size can be readily made without special equipment, merely by casting, painting, dipping, or other standard coating techniques. The dimensions of the so-produced film or reinforced film or other shape can be closely controlled. Furthermore, such used copolymeric ion exchange materials can be recovered and purified merely by converting same back to the intermediate form, dissolving and separating the impurities therefrom.

The intermediate polymer which serves as the precursor to the polymer containing ion exchange sites is prepared from monomers which are fluorine-substituted vinyl compounds. The polymers include those made from at least two monomers with at least one of the monomers coming from each of the two groups described below. The first group comprises fluorinated vinyl compounds such as vinyl fluoride, hexafluoropropylene, vinylidene fluoride, trifluoroethylene, chlorotrifluoroethylene, perfluoro (alkyl vinyl ether), tetrafluoroethylene and mixtures thereof.

The second group includes monomers containing or capable of being converted to cation exchange materials containing pendant sulfonic acid, carboxylic acid and less desirably phosphoric acid groups. Esters or salts which are capable of forming the same ion exchange groups can also be utilized. Furthermore, the monomers of the second group can also contain a functional group in which an ion exchange group can easily be introduced and would include such groups as oxyacids, salts, or esters of carbon, nitrogen, silicon, phosphorus, sulfur, chlorine, arsenic, selenium, or tellurium.

One of the preferred family of monomers in the second group is the sulfonyl containing monomers containing the precursor —$SO_2F$. One example of such a comonomer is $CF_2=CFSO_2F$. Additional examples can be represented by the generic formula $CF_2=CFR_fSO_2F$ wherein $R_f$ is a bifunctional perfluorinated radical comprising 2 to 8 carbon atoms. The particular chemical content or structure of the radical linking the sulfonyl group to the copolymer chain is not critical and may have fluorine, chlorine or hydrogen atoms attached to the carbon atom to which is attached the sulfonyl group, although the carbon atom must have at least one fluorine atom attached. If the sulfonyl group is attached directly to the chain, the carbon in the chain to which it is attached must have a fluorine atom attached to it. The $R_f$ radical of the formula above can be either branched or unbranched, i.e., straight chained, and can have one or more ether linkages. It is preferred that the vinyl radical in this group of sulfonyl fluoride containing comonomers be joined to the $R_f$ group through an ether linkage, i.e., that the comonomer be of the formula $CF_2=CFOR_fSO_2F$. Illustrative of such sulfonyl fluoride containing comonomers

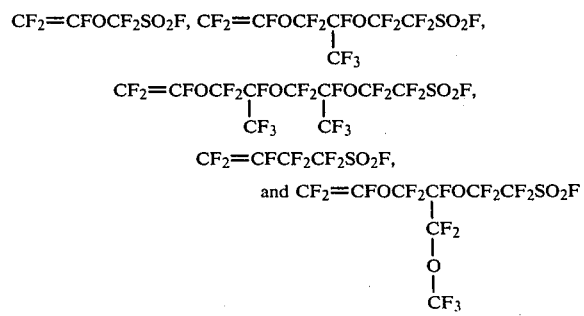

The most preferred sulfonyl fluoride containing comonomer is perfluoro(3,6-dioxa-4-methyl-7-octenesulfonyl fluoride)

$$CF_2=CFOCF_2CFOCF_2CF_2SO_2F.$$
$$\phantom{CF_2=CFOCF_2C}|$$
$$\phantom{CF_2=CFOCF_2}CF_2$$

The sulfonyl containing monomers are disclosed in such references as U.S. Pat. No. 3,282,875 to Connolly et al. and U.S. Pat. No. 3,041,317 to Gibbs et al., U.S. Pat. No. 3,560,568 to Resnick and U.S. Pat. No. 3,718,627 to Grot.

The preferred intermediate copolymers are perfluorocarbon, i.e., perfluorinated, although others can be utilized as long as there is a fluorine atom attached to the carbon atom which is attached to the sulfonyl group of the polymer. The most preferred copolymer is a copolymer of tetrafluoroethylene and perfluoro(3,6-dioxa-4-methyl-7-octenesulfonyl fluoride) which comprises 10 to 60 percent, preferably 25 to 50 percent, by weight, of the latter.

The intermediate copolymer is prepared by general polymerization techniques developed for homo- and copolymerizations of fluorinated ethylenes, particularly those employed for tetrafluoroethylene which are described in the literature. Nonaqueous techniques for preparing the copolymers of the present invention include that of U.S. Pat. No. 3,041,317, to Gibbs et al., by the polymerization of the major monomer therein, such as tetrafluoroethylene, and a fluorinated ethylene containing sulfonyl fluoride in the presence of a free radical initiator, preferably a perfluorocarbon peroxide or azo compound. at a temperature in the range of 0° C. to 200° C. and at pressures in the range of 1 to 200 or more atmospheres. The nonaqueous polymerization may, if desired, be carried out in the presence of a fluorinated solvent. Suitable fluorinated solvents are inert, liquid, perfluorinated hydrocarbons, such as perfluoromethylcyclohexane, perfluorodimethylcyclobutane, 1,1,2-trichlorotrifluoroethane, perfluorooctane, perfluorobenzene, and the like.

Aqueous techniques for preparing the intermediate copolymer include contacting the monomers with an aqueous medium containing a free radical initiator to obtain a slurry of polymer particles in nonwater-wet or granular form, as disclosed in U.S. Pat. No. 2,393,967 to Brubaker, contacting the monomers with an aqueous medium containing both a free radical initiator and a telogenically inactive dispersing agent, to obtain an aqueous colloidal dispersion of polymer particles, and coagulating the dispersion, as disclosed, for example, in U.S. Pat. No. 2,559,752 to Berry and U.S. Pat. No. 2,593,583 to Lontz.

Conversion of the intermediate polymer to a polymer containing ion exchange sites is by conversion of the sulfonyl fluoride ($-SO_2F$) or sulfonate ester groups ($-SO_3R$) to $SO_3X$ where X=hydrogen or alkali metal. The converted polymer is a fluorine containing polymer with a plurality of sulfonyl groups present as ion exchange sites. These ion exchange sites will be contained in side chains of the polymer and will be attached to individual carbon atoms to which are attached at least one fluorine atom. Conversion of all or substantially all sulfonyl groups in the intermediate polymer to ion exchange sites is not necessary. This conversion may be in accordance with known techniques in the prior art, e.g., U.S. Pat. No. 3,770,567 to Grot and U.S. Pat. No. 3,784,399 to Grot.

Another preferred family of monomers of the second group is the carboxyl containing monomers of the structure referred to previously in discussing the sulfonyl monomers wherein the carboxyl group replaces the sulfonyl group. Often, the final copolymer contains one less carbon atom than the corresponding sulfonyl copolymer due to conversion process such as discussed in U.S. Pat. No. 4,151,053 (see Column 7, lines 37–64). Particularly preferred monomers in this group include $$CF_2=CF-O-CF_2CF(CF_3)O(CF_2)_2COOCH_3$$

and $$CF_2=CF-O-CF_2CF(CF_3)OCF_2COOCH_3$$

Such monomers can be made in accordance with the teachings found in U.S. Pat. No. 4,151,053 or Japanese Published Patent Application No. 52(1977) 38486. Methods of copolymerization are likewise disclosed therein.

The preferred soluble copolymer of the present invention is one which comprises 10 to 60 percent, more preferably 25 to 40 percent, by weight, of the second monomer so as to yield equivalent weights in the range of 1000 to 1600 or most preferably in the range of 1000 to 1300.

The soluble fluoropolymer of the instant invention is also characterized by the presence of the carboxyl and/or sulfonyl groups represented by the formula:

$$OCF_2CF_2X$$

and/or $$OCF_2CF_2Y-O-YCF_2CF_2O$$

wherein X is sulfonyl fluoride, carbonyl fluoride, sulfonate ester, or carboxylate ester and Y is sulfonyl ($-SO_2-$) or carboxyl ($-CO-$).

The aforedescribed intermediate polymer can be dissolved only by use of the specific solvents disclosed hereinafter.

The solvents useful in the present invention are low molecular weight polymers of perhalogenated alkyls and/or perhalogenated alkylethers having boiling points in the range of 200° C. to 350° C. Particularly preferred are the oligomers or telomers of chlorotrifluoroethylene, $-(CF_2\text{-}CFCL)_n-$wherein n is 5 to 15 having boiling points between about 200° C. and 350° C., and perfluorokerosenes having boiling points between about 200° C. and 350° C.

Typical perhalogenated alkyl solvents available commercially are the "Halocarbon Oils" sold by Halocarbon Products Corp., Hackensack, N.J. Particularly preferred of these saturated low molecular weight polymers of chlorotrifluoroethylene are Halocarbon Oil 11-14 and Halocarbon Oil 11-21. Similar solvents useful in the instant invention are the FLUOROLUBES ® sold by Hooker Chemical Corporation, Niagara Falls, N.Y. Preferred among the FLUOROLUBES ® are Fluorolubes FS-5 and MO-10.

Ugine Kuhlmann of Paris, France, also offers low molecular weight polymers of chlorotrifluoroethylene in their Voltalef ® oil line. A typical solvent from this company useful in the present invention would be Voltalef® 10-S.

Typically, after forming the intermediate polymer it is converted to the ionic form so as to have its ion exchange character in battery use, electrolytic cell use, as for example, chlor-alkali cells, the membrane is merely treated with caustic solution which converts the intermediate polymer to the sodium salt. Likewise, the material can be converted to the acid form to gain its ionic character, as for example, when utilized as a catalyst. This is true whether the intermediate polymer is in the sulfonyl or carboxyl form. The ion exchange materials are then utilized in the desired manner.

During use, the ion exchange materials become contaminated. Typical of such contamination is for example found in chlor-alkali cells wherein the membrane can become contaminated with calcium impurities and other impurities found in the feed brine. This contamination gradually builds up in the ion exchange membrane causing a decrease in current efficiency until the operation no longer is economic. At this point in the practice of the prior art, the ion exchange membranes were replaced in the cell and merely discarded.

However, in the practice of the instant invention, such used membranes as well as membranes which have been damaged by tearing or developing pinholes, can be recycled. In this invention, the used membrane material or catalysts in the case of recycling catalysts, is first converted to the intermediate polymer form. That is, the acid or sodium salt form is first converted to the sulfonyl fluoride, carbonyl fluoride, sulfonate ester, and/or carboxylate ester form. Once the conversion is made to this intermediate polymer form, it can be dissolved in the solvent previously described and separated from the contaminants by any of the methods known to those skilled in the art. Typical of such methods is merely filtering the dissolved intermediate polymer away from the solid contaminants or precipitating dissolved impurities therefrom.

After removal of the impurities from the dissolved intermediate polymer, it can again be processed to form the desired cation exchange products by methods known to those skilled in the art, but preferably directly from the solvent form, such as by painting, dipping, or other coating methods.

Various methods may be utilized to convert the contaminated cation exchange materials back to the intermediate polymer form, which can then be dissolved in the solvent of the instant invention, followed by reforming the desired shape of membrane. The cation exchange materials are normally in the form of sulfonic acids, carboxylic acids, or salts thereof. In these forms, the materials are not soluble nor thermoplastic. To return such materials to the soluble and thermoplastic stage, they must be converted back to the sulfonyl fluoride form, carbonyl fluoride form, sulfonate ester form or the carboxylate ester form. Numerous methods are available for such conversion, as are evident to those skilled in the art. Direct fluorination or direct esterification are the preferred methods of conversion of the cation exchange materials back to the intermediate polymer form. Typical esterification of the carboxylic acid form of cation exchange materials would involve the reaction of same with an alcohol in the presence of the appropriate catalyst. An appropriate catalyst would be boron trifluoride for such a reaction. The resulting ester would be soluble in the solvents of the present invention, thus making possible the recovery and recasting of scrap or contaminated membrane cation exchange resin materials.

Instead of esterification, direct fluorination of the acid form of the cation exchange material can be accomplished with phosphorus pentafluoride, HF, sulfur tetrafluoride, fluorine gas or the like. In such processes, the cation exchange membrane is acidified so that it is, or is converted to, the acid form and then treated with a fluorinating agent. In each direct fluorination route, it should be remembered that the backbone of the polymeric cation exchange material which is being fluorinated is highly hydrophobic and nonpolar in structure, while the reactants are polar. The rate of diffusion of the reactants into the polymer are therefore, extremely slow and require long periods of time for significant fluorination, as will be evidenced by the later examples.

Various indirect routes to recovering the material are also available, such as for example, the sulfonic acid form of cation exchange material, can be converted to the sulfonyl chloride form (—SO₂Cl) through chlorination via such chlorinating agents as PCl₅/POCl₅, or the like, which convert the cation exchange material to the sulfonyl chloride form. In the chloride form, the material is not stable and cannot be easily dissolved in the solvents of the instant invention without giving off SO₂ which destroys the ion exchange character of the copolymeric materials. Thus, such chlorinations must be followed by a fluorine substitution reaction prior to dissolution to prevent the sulfonyl chloride form from thermally degrading. Thus, the sulfonyl chloride must be converted to the fluorine form prior to dissolution and such conversion can be obtained by well known fluorination techniques, such as the use of antimony fluorides to yield the soluble sulfonyl fluoride form of the intermediate copolymer.

Another typical conversion method is to first convert the sulfonic acid ionic form of the cation exchange resin to the corresponding halide then in turn, to the carboxylic form by the use of a strong reducing agent, such as described in U.S. Pat. No. 4,151,053. In the process, for the preparation of the products of this invention, the pendant sulfonyl groups in the form represented by the formulas:

  A and/or

  B

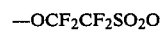

wherein X is halogen, especially flourine or chlorine; hydroxyl; alkyl containing up to four carbon atoms; aryl or OZ where Z is a metallic atom, especially an atom of an alkali metal, alkyl containing up to four carbon atoms or aryl; are converted to:

by treatment with a reducing agent.

Since the conversion to a carboxylic acid group is effected chemically, it can be controlled so as to produce products with substantially any degree of carboxylation which may be desired subject to the limitations imposed by the functionality of the starting copolymer.

The starting polymers are usually formed from sulfonyl fluoride substituted compounds which remain intact during polymerization. The sulfonyl fluoride groups can directly be treated with a reducing agent to be converted to the carboxylic acid groups. Alternatively, they may be first converted to any of the other derivatives of sulfonic acid as defined in the above formulas (A) and (B) by known reactions, followed by conversion into the carboxylic acid groups. The sulfonyl chloride groups are especially preferred due to higher reactivity. Therefore, it is often desirable to convert the sulfonyl fluoride to any of the other derivatives of sulfonic acid defined above in connection with the definition of X. Such reactions can be readily carried out by procedures well known in the art.

The formation of the carboxylic group may follow any of several pathways.

It may be formed by reduction to a sulfinic acid with a relatively weak reducing agent followed by a heat treatment as indicated below:

$-OCF_2CF_2SO_2X \rightarrow OCF_2CF_2SO_2M \xrightarrow{Heat} -OCF_2COOM$.

Conversion into carboxylic acid groups can be more readily be effected when M in the above formulas is hydrogen. Alternatively the treatment may be stepwise in which initially a sulfinic acid is produced and this is converted to a carboxylic group by the use of a strong reducing agent. This may take place as indicated below:

$-OCF_2CF_2SO_2X \rightarrow OCF_2CF_2SO_2M \rightarrow OCF_2COOM$.

With some reducing agents, the treatment may be directly from the sulfonic group to the carboxyl group, as indicated by,

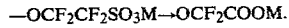

$-OCF_2CF_2SO_3M \rightarrow OCF_2COOM$.

It is preferred that the concentration of sulfinic acid groups in the final product be relatively low. Accordingly, it may be desirable, but not necessary, to oxidize residual sulfinic acid groups back to sulfonic acid groups by the following sequence:

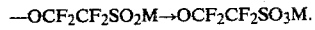

$-OCF_2CF_2SO_2M \rightarrow OCF_2CF_2SO_3M$.

This may be accomplished by known procedures utilizing for example aqueous mixtures of sodium hydroxide and hypochlorite.

The reducing agents which can be used in the present invention are exemplified as shown below. Those skilled in the art are completely familiar with these reducing agents and many other similar reducing agents as well as procedures by which they are employed. However, some of the reducing agents such as hydrazine having amino groups which are capable of forming sulfonamide groups as disclosed in German Patent OLS No. 2,437,395 (U.S. Patent Application Ser. No. 406,361 filed Oct. 15, 1973) are not suitable for the purpose of the invention, and therefore they are excluded from the scope of the invention.

The reducing agents of the first group are metal hydrides of the generic formula $MeLH_4$, wherein Me represents an alkali metal atom and L an aluminum or boron atom, or $Me'H_x$, wherein Me' represents an alkali metal atom or alkaline earth metal atom and x is an integer with a value of 1 to 2. These include, for example, lithium aluminum hydride, lithium borohydride, potassium borohydride, sodium borohydride, sodium hydride and calcium hydride.

The reducing agents of the second group are inorganic acids possessing reducing activity such as, for example, hydroiodic acid, hydrobromic acid, hypophosphorus acid, hydrogen sulfide and arsenious acid.

The reducing agents of the third group are mixtures of metals and acids. Examples of these mixtures include tin, iron, zinc and zinc amalgam and those of acids include hydrochloric acid, sulfuric acid and acetic acid.

The reducing agents of the fourth group are compounds of low-valency metals. Examples of these compounds include stannous chloride, ferrous sulfate and titanium trichloride. They may be used in conjunction with such acids as hydrochloric acid and sulfuric acid.

The reducing agents of the fifth group are organic metal compounds. Examples of these reducing agents include butyl lithium, Grignard reagent, triethyl aluminum and tri-isobutyl aluminum.

The reducing agents of the sixth group are inorganic acid salts possessing reducing activity and similar compounds. Examples of these reducing agents include potassium iodide. sodium iodide, potassium sulfide, sodium sulfide, ammonium sulfide, sodium sulfide, sodium dithionite, sodium phosphite, sodium arsenite, sodium polysulfide and phosphorus trisulfide.

The reducing agents of the seventh group are mixtures of metals with water, steam, alcohols or alkalis. Examples of metals usable in the mixtures include sodium, lithium, aluminum, magnesium, zinc, iron and amalgams thereof. Examples of alkalis include alkali hydroxides and alcoholic alkalis.

The reducing agents of the eighth group are organic compounds possessing a reducing activity such as, for example, triethanol amine and acetaldehyde.

Among the groups as enumerated above, those belonging to the second, third, fourth, and sixth groups are found to be preferable.

The optimum conditions for treatment with a reducing agent will be selected depending on the selected reducing agent to be used and on the kind of substituent X in the $SO_2X$ group. Generally, the reaction temperature is in the range of from $-50°$ C. to $250°$ C., preferably from $0°$ C. to $150°$ C., and the reducing agent is used in the form of a gas, liquid or solution. As the solvent for the reaction, there can be used water; polar organic solvents such as methanol, tetrahydrofuran, diglyme, acetonitrile, propionitrile or benzonitrile or nonpolar organic solvents such as n-hexane, benzene or cyclohexane or mixtures of such solvents.

The amount of the reducing agent is not less than the equivalent weight of the sulfonyl group present in the surface. Generally, the reducing agent will be used in large excess. The pH value of the reaction system will be selected on the basis of the particular reducing agent employed.

The reaction can be carried out under reduced, normal or increased pressure. In the reaction involving the use of a gaseous reducing agent, the increased pressure can improve the velocity of the reaction.

The reaction time generally ranges from one minute to 100 hours.

The course of the reaction may be followed by analysis of the infrared absorption spectrum of the membrane. as is particularly illustrated in the examples. Key bands in following the reaction are as follows:

sulfonyl chloride—1420 cm$^{-1}$
sulfinic acid salt—940 cm$^{-1}$ sulfinic acid salt—1010 cm$^{-1}$
carboxylic acid—1780 cm$^{-1}$
carboxylic acid salt—1690 cm$^{-1}$.

The specific functional groups of the invention are found to be unitary species having a neutralization point at approximately pKa=2.5 from measurement of electric resistance and infrared spectrum by varying pH. Said functional groups exhibit characteristic absorptions at 1780 cm$^{-1}$ (H form) and at 1690 cm$^{-1}$ (Na form). Furthermore, when converted into chlorides by treatment with PCl$_5$/POCl$_3$, they are found to exhibit characteristic absorption a 1810 cm$^{-1}$. From these measurements, they are identified to be carboxylic acid groups. By elemental analysis by the combustion method, the sulfur atom concentration is found to be decreased by one atom per one exchange group. The fluorine atom concentration is observed to be lessened by two atoms per one exchange group by the alizarin-complexion method. From these results of analysis and also from the fact that carboxylic acids are formed by use of reducing agents containing no carbon atom under an atmosphere free of carbon atoms, the above functional groups are confirmed to be —OCF$_2$COOM. This structure is also evidenced by measurement of the NMR spectrum of C$^{13}$ of the product obtained by the reaction, corresponding to the above polymer reaction, conducted for the monomer having the functional group of —OCF$_2$CF$_2$SO$_2$X.

The products of the treatment with a reducing agent may take three typical forms. These are:

(1) All of the —COOM groups required may be formed.

(2) Not all —COOM groups required may be formed and —SO$_2$M groups may be present.

(3) Substantially all —SO$_2$M groups may be present.

In the first instance, no further treatment will be required. In the second and third case, there are two alternatives. A more powerful reducing agent may be employed, or the —SO$_2$M groups may be converted to carboxylic acid groups by heat treatment, which is advantageously carried out when M is hydrogen. The heating may take place at any selected practical pressure at a temperature of from 60° C. to 400° C. for a period of from 15 to 120 minutes. The preferred conditions for efficiency and economy are atmospheric pressure, 100° C. to 200° C. and 30 to 60 minutes.

Any remaining sulfinic acid group may be converted into the sulfonic acid group, if desired. This conversion of the sulfinic acid group to the sulfonic acid group can easily be accomplished such as by subjecting the former group to oxidation in an aqueous solution of 1 to 5 percent NaClO or an aqueous solution of 1 to 30 percent H$_2$O$_2$ at 40° C. to 90° C. for 2 to 20 hours.

The reducing agent to be used for the purpose of this invention is selected, as in ordinary organic reactions, with due consideration to numerous factors such as the kind of the substituent X in the SO$_2$X group, the kind of the reducing agent, the kind of the solvent to be used, the temperature of the reaction, the concentration, the pH value, the reaction time and the reaction pressure.

The reducing agents of the first group can be applied to virtually all SO$_2$X groups. Occasionally, the reaction proceeds to an advanced extent to produce a product which appears to be an alcohol.

The reducing agents of the second, third and fourth groups are particularly effective when applied to sulfonyl halide groups of relatively high reactivity.

The reducing agents of the fifth, sixth, seventh and eighth groups are also effective for application to sulfonyl halide groups, although use of these reducing agents frequently produces the sulfinic acid alone. Use of the —SO$_2$F group demands specially careful selection of the reaction conditions, for it may possibly induce hydrolysis in the presence of a reducing agent from the sixth, seventh and eighth groups.

It is possible to convert the —SO$_2$Cl group directly into the carboxylic group without going through the intermediate of sulfinic acid. For example, the conversion can be accomplished by subjecting the membrane of the fluorocarbon polymer possessing the —SO$_2$Cl group to elevated temperature and/or to ultraviolet rays and/or to an organic or inorganic peroxide.

As a matter of course, the reaction of the present invention can be applied to other monomers possessing similar side chains. Thus, fluorocarbon monomers possessing a sulfinic acid group or carboxylic acid group can readily be synthesized by said reaction.

It will be noted that the ultimate effect of the treatment with a reducing agent can be represented by the following reaction:

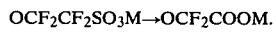

OCF$_2$CF$_2$SO$_3$M→OCF$_2$COOM.

The membranes of this invention have many advantages, some of which have already been mentioned above.

In the following examples, unless otherwise noted, the cation exchange copolymeric material referred to is a copolymer of tetrafluoroethylene and perfluoro(3,6-dioxa-4-methyl-7-octene sulfonyl fluoride) which is in the acid form, i.e., sulfonic acid form. Likewise, the carboxyl form is the same copolymeric material wherein the sulfonic acid groups are replaced by carboxylic acid groups. For simplicity sake, they will be referred to as sulfonic acid form cation exchange material and carboxylic acid cation exchange materials, respectively, in the following examples.

EXAMPLE 1

Particulate carboxylic acid form cation exchange material, the structure as defined earlier (48.3 grams), was placed in a 300 ml. flask equipped with a Drierite protected reflux condenser. To the flask was added 150 ml. of C.P. methanol, followed by 50 ml. of a 50% solution of boron trifluoride in diethyl ether. The mixture was slurried on a magnetic stirrer hot plate and heated to reflux. After 24 hours, the polymer was separated on a filter and washed with methanol until the filtrate was neutral. The product was dried in a vacuum oven at 70° C. Forty-eight grams of this polymer were dissolved in a mixture of 19.2 grams Halocarbon Oil 11-21 and 173 grams of Halocarbon Oil 11-14 at 230° C. Into this solution was dipped a 3½ inch×9 inch piece of T-26C Teflon ® cloth wrapped around a glass mandrel. The residence time for the dipping was approximately five seconds. After rinsing with methylene chloride, the coated mandrel was dried at 225° C. for 15 minutes. The process was repeated twice more for a total of three dippings. The reinforced film was removed from the mandrel and was used as a separator in a standard laboratory three-square inch chlor-alkali electrolytic cell where it produced sodium hydroxide at a concentration of 386 grams per liter and 86.6% current efficiency (5.16 volt cell potential).

In this run, there was essentially complete conversion of the starting carboxylic acid form cation exchange material to the corresponding methyl ester, which was dissolved in the named solvent and reformed into a reinforced film, which after conversion to the ionic form was again used in a chlor-alkali cell with good results.

EXAMPLE 2

Particulate carboxylic acid form cation exchange material (25 grams) was placed in a 250 ml. flask together with 100 grams methylene chloride, 25 grams N-propanol, and 5 drops of concentrated sulfuric acid. The flask was equipped with Dean-Stark trap (modified for use with heavier than water solvents) and heated on a magnetic stirrer-hot plate. After heating and stirring for 24 hours, the receiver of the trap was filled with Drierite and the reaction continued for an additional 24 hours. The product was then separated on a filter, washed well with methanol and methylene chloride and dried at 70° C. in a vacuum oven. The temperature during the 48-hour reaction period was maintained at approximately 40° C. Twenty-three grams of the polymeric material yielded by the reaction were in the N-propyl ester form and dissolved at 230° C. in a mixture of 83 grams Halocarbon Oil 11-14 and 9 grams Halocarbon Oil 11-22. After separating the remaining solids from the resulting solution, a 3×4-inch piece of T-26C Teflon® cloth supported on a glass mandrel was dipped into the solution. The dwell time of the dipping was 10 seconds. The coated mandrel was soaked in methylene chloride for 30 minutes, air dried for 4 hours, then baked at 195°-200° C. for 15 minutes. The resulting reinforced film was removed from the mandrel and was of excellent pinhole-free quality. After being converted to the ionic or cation exchange form by treatment with caustic, the reinforced film was utilized in a laboratory scale chlor-alkali cell with results essentially equivalent to those given in Example 1 above.

EXAMPLE 3

Thirty grams of sulfonic acid form cation exchange material (1100 equivalent weight, pulverized to 30 micron powder) were charged into a one liter Monel-lined pressure vessel. Two hundred grams of $SF_4$ and 20 grams of HF were distilled into the chilled reactor. The reactor was then sealed and thermostatted at 5° C. for 48 hours. The pressure in the reactor was 90 psi. Thereafter, the product was removed and vacuum dried at 80° C. for 24 hours. One gram of the product was found to be soluble in 20 grams of Halocarbon Oil 11-21 at 240° C. Infrared analysis of a film formed from this solution confirmed the presence of sulfonyl fluoride groups and the absence of sulfonic acid groups in the resin, thus indicating a 100% conversion to the desired sulfonyl fluoride form in the recast film.

EXAMPLE 4

A representative example of the conversion of the sulfonic acid cation exchange resin to the sulfonyl chlorate form is as follows:

A 500 ml flask fitted with condenser stirrer, and heater was charged with 200 g of $POCl_3$ and 100 g of $PCl_5$. To these reactants was added 2 g of a 7 mil thick film of sulfonic acid form, cation exchange material previously dried at 110° C. for 2 hours, and the temperature raised to the reflux point, 113° C. It was held at this temperature for 72 hours, then removed and washed in hot $CCl_4$ until free of reactants. The membrane was tested for the presence of the sulfonyl chloride group using infrared analysis and showed a strong absorbance at 1420 cm$^{-1}$ ($-SO_2Cl$) with the disappearance of the sulfonic acid absorbance at 1070 cm$^{-1}$.

EXAMPLE 5

Fifty grams of sulfonic acid form cation exchange material (1100 equivalent weight, ground to 30 micron powder) were treated in a $PCl_5/POCl_3$ bath under conditions like those described in Example 4 suitably modified to accommodate the increased quantity of resin. The resulting resinous material in the sulfonyl chloride form was transferred to a 1 liter Monel reaction bomb into which were added 300 grams of HF and 15 grams of antimony pentafluoride. The vessel was sealed and heated to 90° C. for 12 hours. Pressure within the bomb was between 120 and 320 psi. The resultant polymer was dissolved in Halocarbon Oil 11-21 to form a 5% solution from which continuous films were cast of this sulfonyl fluoride intermediate form, which upon hydrolysis yielded the sulfonic form of the cation exchange copolymer.

EXAMPLE 6

Twenty-five grams of sulfonic acid form cation exchange material of the structure previously mentioned (1100 equivalent weight, ground to 30 micron powder) were treated in a $PCl_5/POCl_3$ bath, as described in Example 5. The resulting resin in the sulfonyl chloride form was washed with N-butanol and transferred to a stirred reaction flask containing 200 grams of N-butanol, 150 grams of tetrahydrofuran, and 20 ml. of pyridine. After one hour under a blanket of nitrogen at room temperature, the temperature was raised to reflux the reaction solution for 16 hours. The resin product, the butyl ester, was washed in methanol and vacuum dried at 70° C. for 24 hours. Ten grams of the N-butyl ester were soluble in 200 ml. of Halocarbon Oil 11-14 at 250° C.

EXAMPLE 7

0.649 gram of sulfonyl chloride form resin as prepared in Example 5, was heated in 15 ml. of lauryl alcohol under nitrogen to 205° C. The reaction temperature was slowly raised to 260° C. over a period of three hours. Gases were evolved initially, and the reaction was terminated one hour after gas evolution had ceased. The resin was washed in methanol, vacuum dried at 70° C. for 16 hours, and dissolved in solvent (0.469 gram resin in 24 ml. of Halocarbon Oil 11-14) at 234° C. A film of the lauryl ester was prepared from this solution, treated in methylene chloride and fused at 170° C. for 24 hours. The resultant film was transparent and not discolored.

EXAMPLE 8

About 150 grams of sulfonic acid form cation exchange material having an equivalent weight of 1200, which had been in service in a chlor-alkali cell for 11 months and which the current efficiency had dropped from 93% to 82%, was pulverized in an attritor mill in the presence of liquid nitrogen until all had been comminuted to less than 30 micron size particles. A one liter shaker-type Monel pressure reactor fitted with a heating jacket for steam or water, was charged with the Nafion powder and purged with dry nitrogen gas three times. A vacuum of 0.5 atmospheres was then applied to the vessel and anhydrous HF is sucked into the reactor from a tared cylinder of HF until 300 grams of HF had been admitted. At this point, nitrogen gas was admitted to the pressure reactor to achieve a pressure of one atmosphere. With the system in oscillation, about 1 gram of fluorine was bled into the reactor. The temperature was then raised to 90° C. and the pressure rose to about 120 psig. The reaction continued for 4 hours and resulted in a drop in pressure from about 120 psi about 110 psi. At this point another 1.0 gram of fluorine was admitted and the procedure repeated for an additional 8 hours, at which point another gram of fluorine was admitted and the reaction allowed to proceed to completion for an additional ten hours. The reactor was cooled, the HF vented through crushed ice and the product removed. A small disc of product weighing approximately 3 grams was formed in a hot press at 260° C. for 5 minutes at 3 tons ram pressure, with no blackening indicating that the stable sulfonyl fluoride form had been achieved. A further test of the presence of the fluoride form was the absorption peaks by IR, showing a strong peak at 1480 cm$^{-1}$ and no peak at 1060 cm$^{-1}$. Further, this material dissolved Halocarbon Oil 11-21 cleanly at 245° C. as a 10% solution with no appreciable discoloration after one hour of solution time. The membrane made by either pressing a film under pressure-temperature conditions as above stated or casting from the solvent on a teflon cloth supported on a mandrel, yielded a membrane about 7 mils thick and about 3 inches in diameter. After hydrolyzing in 20% KOH-dimethyl sulfoxide at 80° C. for one hour, this membrane was placed in the chlor-alkali cell of Example 1 where it yielded liquor of 360 grams per liter caustic at 87% current efficiency and 4.1 volts.

EXAMPLE 9

Into a 1 liter nitrogen-flushed Monel reactor equipped with a reflux condenser, 50 grams of antimony pentachloride, 500 grams anhydrous HF and 50 grams of 30 micron powdered sulfonyl chloride form resin (prepared as in Example 5) (1200 equivalent weight) was added. The mixture was stirred and heated to 100° C. (140–360 psi) and was kept at this temperature for approximately 8 hours. The rapidly increasing pressure (HCL) was released by an automatic valve to keep the pressure below 360 psi. The reactor was cooled to room temperature and the contents filtered under dry nitrogen. The filtrate was returned to the reactor for use in the nex reaction, and the solid on the filter represented the equivalent sulfonyl fluoride material. The product was soluble in Halocarbon Oil 11-14, as in the previous examples and was recoverable therefrom in a form suitable for conversion to cation exchange membrane material.

Other Lewis acid catalysts besides antimony pentahalide can be used in the above example, such as boron trifluoride, FeCl$_3$, aluminum trichloride, tin tetrachloride and zinc chloride. Similarly, the carboxylic acid form cation exchange materials in the carbonyl chloride form can be converted to the equivalent carbonyl fluoride by this method disclosed.

EXAMPLE 10

Sixteen grams KF and 50 grams of 30 micron powdered sulfonyl chloride form resin (prepared as in Example 5) were charged into a one liter electrofluorinating cell made of nickel (having a 500-square centimeter nickel anode surface area), followed by 800 ml. anhydrous HF. The contents were stirred at about 0° C. and electrolyzed at 5–7 volts cell potential and 20 milliamps per square centimeter current density. The required electrolysis time is determined by following by the analysis of evolved chlorine and HCl. After 16 hours, little or no chlorine was being flushed out and the cell contents were filtered with the exclusion of moisture and the filtrate reused in the next electrolysis. The product on the filter was solid and was analyzed spectrographically to confirm the product as being the corresponding sulfonyl fluoride material, which was soluble in Halocarbon Oil 11-21. This was castable to form sheet membrane material, and upon hydrolysis possessed the desired cation exchange properties.

The corresponding carbonyl chloride can likewise be converted to the carbonyl fluoride by the method described in this Example.

EXAMPLE 11

In this example, the reactor was a 12 inch long and 1 inch inside diameter nickel tube reactor in a vertical position, having a cooling jacket filled with chilled fluid. The reactor was charged to about ⅝ height with anhydrous liquid HF, followed by 30 grams of powdered 30 micron sulfonic acid form cation exchange material in the sulfonyl chloride form resin prepared as in Example 5. A gaseous mixture of fluorine and nitrogen in a ratio of 1 to 20 was bubbled through the suspension while it was being cooled. This mixture was slowly enriched in fluorine as the run proceeded up to a ratio of approximately 1 to 2. After the chlorine-fluorine exchange was completed, the product was removed and heated to completely dissolve the resulting sulfonyl fluoride product in Halocarbon Oil 11-14 and was suitable for preparing membranes for use in chlor-alkali electrolysis cells.

What is claimed is:

1. A method of recovering for reuse cation exchange polymeric material polymerized from at least two monomers, one said monomer consisting essentially of at least one fluorinated vinyl compound and said other monomer consisting essentially of at least one monomer of the structure

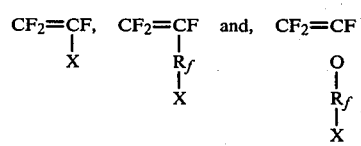

wherein $R_f$ is a bifunctional perfluorinated radical containing from 2 to 8 carbon atoms, which carbon atoms may be interrupted by one or more oxygen atoms, and X is selected from the group consisting of sulfonic acid and carboxylic acid, said method comprising, converting said cation-exchange polymeric material to a precursor form selected from the corresponding sulfonyl fluoride, carbonyl fluoride, sulfonate ester and carboxylate ester, thereafter dissolving said precursor form in at least one solvent selected from the group consisting of low molecular weight polymers of perhalogenated alkylethers, low molecular weight polymers of perhalogenated alkyls and perflourokerosenes, each having boiling points between about 200° C. and 350° C., separating said dissolved polymeric material in the precursor form from any impurities, thereafter resolidifying said purified polymeric material in the precursor form in the desired shape.

2. A method of recovering for reuse cation exchange polymeric material polymerized from tetrafluoroethylene a monomer of the formula

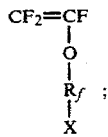

wherein $R_f$ is a bifunctional perfluorinated radical containing from 2 to 8 carbon atoms, which carbon atoms may be interrupted by one or more oxygen atoms, and X is selected from the group consisting of sulfonic acid and carboxylic acid, said method comprising, converting said cation exchange polymeric material to a precursor form selected from the corresponding sulfonyl fluoride, carbonyl fluoride, sulfonate ester and carboxylate ester, thereafter dissolving said precursor form in at least one solvent selected from the group consisting of low molecular weight polymers of perhalogenated alkylethers, low molecular weight polymers of perhalogenated alkyls and perfluorokerosenes, each having boiling points between about 200° C. and 350° C., separating said dissolved polymeric material in the precursor form from any impurities, thereafter resolidifying said purified polymeric material in the precursor form in the desired shape.

* * * * *